(12) United States Patent
Günther et al.

(10) Patent No.: US 7,571,956 B2
(45) Date of Patent: Aug. 11, 2009

(54) VEHICLE COCKPIT WITH HEAD-UP DISPLAY

(75) Inventors: Peter Günther, Gross-Gerau (DE); Ralf Leupert, Hofheim (DE); Levente Szóke, Dieburg (DE); Thomas Vorberg, Goldbach (DE)

(73) Assignee: Siemens Aktiengesellschaft, München (DE)

( * ) Notice: Subject to any disclaimer, the term of this patent is extended or adjusted under 35 U.S.C. 154(b) by 231 days.

(21) Appl. No.: 11/807,541

(22) Filed: May 29, 2007

(65) Prior Publication Data
US 2007/0290519 A1    Dec. 20, 2007

(30) Foreign Application Priority Data
May 31, 2006 (DE) ................. 10 2006 025 386

(51) Int. Cl.
*B60K 37/00* (2006.01)
(52) U.S. Cl. ................. 296/193.02; 296/70; 248/115
(58) Field of Classification Search .............. 296/70, 296/193.02; 348/115
See application file for complete search history.

(56) References Cited

U.S. PATENT DOCUMENTS
2007/0290524 A1* 12/2007 Szoke et al. ........... 296/190.08

FOREIGN PATENT DOCUMENTS
DE    10 2005 031 357    1/2006

* cited by examiner

*Primary Examiner*—Joseph D Pape
(74) *Attorney, Agent, or Firm*—Cohen Pontani Lieberman & Pavane LLP

(57) ABSTRACT

A vehicle cockpit includes a head-up display, a transverse beam, and an end wall for separating the cockpit from the engine compartment. To fit the head-up display in a relatively easy manner, a holder is provided for pre-fitting or pre-installing the head-up display on the transverse beam and for a final fitting of the head-up display on a further supporting body part. As a result, the transverse beam with the pre-fitted head-up display can be inserted in the vehicle as a module.

9 Claims, 4 Drawing Sheets

VEHICLE COCKPIT WITH HEAD-UP DISPLAY

BACKGROUND OF THE INVENTION

1. Field of the Invention

The present invention relates to a vehicle cockpit with a head-up display, a transverse beam and an end wall for separating the cockpit from the engine compartment. The invention also relates to a method for fitting or installing such a vehicle cockpit.

2. Description of the Related Art

Head-up displays are used in vehicles to provide the driver with additional information during driving. In head-up displays, for example in passenger cars, data and items of information are projected directly onto the front windshield, so that the driver does not need to take his eyes off the traffic to see the projected information. To this end, an image is produced by a light source under the instrument panel, i.e. a projector, directed via a plurality of mirrors and projected upward onto the front windshield, from where it is reflected in the direction of the driver and can thus be seen by him. On account of the complex optical processes, the head-up display needs to be kept at a specific angle to the windshield since even slight deviations lead to a strong optical displacement or distortion of the projected image. Above all, the head-up display must not execute oscillations with respect to the front windshield during operation of the vehicle and the jolts and vibrations which inevitably occur in the process, which oscillations would have a direct effect on the readability of the image, i.e. the head-up display must be held precisely in its relative position even during the operation of the vehicle. To avoid relative movements, it should therefore be connected to the front windshield as directly as and via the shortest path possible. In known solutions, the head-up display is for this reason attached to the end wall separating the passenger compartment from the engine compartment or directly to the lower frame of the windshield. Since the head-up display requires a relatively large physical space, only the region in front of the multi-purpose instrument between the transverse beam and the front termination of the vehicle cockpit provides a suitable installation site. It has been found that the known solutions are unsuitable for a modular design of the cockpit, in which a plurality of technical components and structural parts are assembled outside the vehicle to form units, which are then inserted in the vehicle; for example, the multi-purpose instrument, the passenger airbag and other components are fitted on the transverse beam such that it can be inserted in the vehicle as a module. This is because generally the head-up display is fitted, for accessibility reasons, before the transverse beam is installed. Another problem with the prior art is that generally the complete instrument panel needs to be dismantled to repair or replace a defective head-up display, which entails a very high complexity in the case of repairs.

SUMMARY OF THE INVENTION

An object of the present invention is to provide a vehicle cockpit with a head-up display which is easy to fit and is suitable for a modular design.

The object is achieved according to an embodiment of the invention by a vehicle cockpit in which attachment means are provided for pre-installation of the head-up display on the transverse beam and for final installation on a further supporting body part.

An advantage of the vehicle cockpit according to the present invention is that the head-up display is able to be attached to a transverse beam of the vehicle cockpit before the transverse beam is inserted in the vehicle. As a result, installation of the head-up display can be included in rationalized installation processes, in which components are assembled outside the vehicle. The final installation on the further body part, i.e. the attachment to the end wall or the lower windshield frame, ensures that the head-up display is held reliably with respect to the front windshield.

In one embodiment, the transverse beam with the pre-installed head-up display is inserted in the vehicle as a module. In this embodiment, the head-up display can also be integrated in a modular cockpit design, in which as many components as possible are installed on the transverse beam outside the vehicle, before the transverse beam is inserted in the vehicle as a module. As a result, a higher degree of integration of the vehicle cockpit is achieved.

In a further embodiment, the attachment means of the head-up display can be accessed after the module has been installed in the vehicle by removing simple screen parts. In this embodiment, the head-up display can be dismantled and installed again independently of the module, so that the head-up display can be repaired or replaced with minimal effort, which means an increased ease of servicing.

The attachment means may have a holder for accommodating the head-up display and for attaching the head-up display to the transverse beam and the further supporting body part for the final installation. The holder is fitted on the transverse beam first and the head-up display is then inserted into the holder. For this reason the actual fitting or installation of the head-up display is considerably simpler than in the prior art. The holder ensures the exact position of the head-up display with respect to the windshield because of the attachment to the further supporting body part. The advantage of attaching the head-up display in the direct vicinity of the windshield bearing element is that only minimal relative movements can occur because of the short paths between the front windshield and the head-up display during the ever-present vibrations and jolts which occur during the operation of the vehicle. The attachment of the holder, having an adequate degree of stiffness, on both sides on the transverse beam and the further supporting body part is a type of bonding action which helps to avoid oscillations of the head-up display.

In one embodiment, the holder is a U-shaped frame having limb ends connected by a middle region. The limb ends are connectable to the transverse beam for pre-installation of the holder thereto. The holder further includes at least one lug at its middle region, by means of which lug the frame can be attached to the end wall, a windshield frame or another supporting body part. As a result, the holder forms a defined place holder for the head-up display. The U-shaped frame is connectable to the transverse beam in a simple manner. As soon as the transverse beam is inserted in the vehicle, the frame can be connected to the supporting structure for a reliable hold or anchorage to the vehicle.

In a further embodiment, the head-up display has at least one attachment lug for supporting the head-up display on at least one lug of the holder. As a result, the holder and the head-up display can be attached in one work step.

The head-up display, which is pre-installed on the transverse beam, can expediently be tested by electric and mechanical means. As a result, faults can be spotted even before installation in the vehicle and can be corrected more easily because the head-up display is then still accessible from nearly all sides.

The object of the invention is also met by a method for installing a vehicle cockpit in a vehicle, in which a head-up display is pre-installed onto a transverse beam of the vehicle cockpit by attachment means and the transverse beam with the pre-installed head-up display is then inserted in the vehicle as a module. Thereafter, the head-up display is finally secured to a further supporting body part. As a result, separate installation of the head-up display in the vehicle is no longer necessary, which leads to savings in terms of time and money.

In one embodiment of the method, a frame-shaped holder is first attached to the transverse beam and the head-up display is inserted in the holder. The holder is connected to the further supporting body part for securing purposes. The holder ensures, in the installed state, the connection between the transverse beam and the supporting structure underneath the windshield. At the same time, the holder keeps free the place for the head-up display. When the head-up display is then inserted in the holder, it only needs to be secured to the holder. The head-up display can thus also be dismantled and installed again independently of the transverse beam for servicing or repair purposes. The exact position is defined by the holder.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained in further detail below with reference to the attached drawings, in which.

DETAILED DESCRIPTION OF THE PRESENTLY PREFERRED EMBODIMENTS

Figure 1:
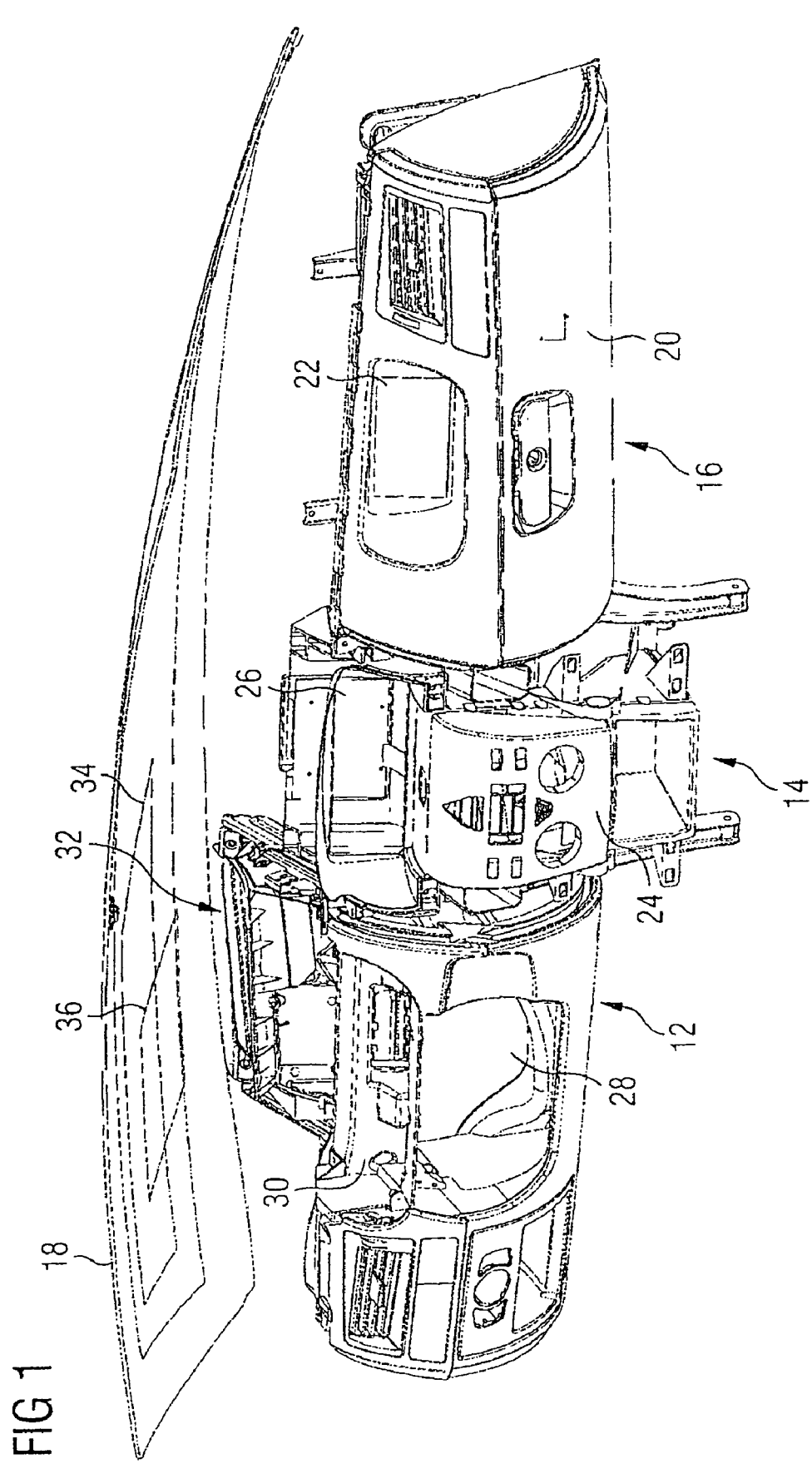
FIG. 1 is a perspective view of a vehicle cockpit according to an embodiment of the present invention in a simplified illustration.

FIG. 1 shows a vehicle cockpit with a driver area 12, a central console area 14 and a passenger area 16. Indicated above the vehicle cockpit is a front windshield 18. A glove compartment 20 and a receptacle 22 for a passenger airbag, which is arranged above the glove compartment, are shown in the passenger area 16. A central control unit 24 for heating, ventilation, air conditioning, etc., is shown in the central console area 14. A receiving device 26 for a display of an on-board computer, which displays information on components of the electronic entertainment means of the vehicle, data from a navigation system, etc., is located above the central control unit 24. A clearance 28 for accommodating a steering column is shown in the driver area 12. A recess 30 is provided above the clearance 28 for the steering column, in which recess 30 a multi-purpose instrument is inserted. A head-up display 32 is shown in front of the recess 30 for the multi-purpose instrument in the direction of travel. In order to improve comprehension of the inventive subject matter shown in the drawing, some components and covers of the vehicle cockpit are not illustrated in FIG. 1, such as top covers of the driver area 12, central console area 14, and passenger area 16.

The head-up display 32 produces an image and projects it upward onto the front windshield 18, where it becomes visible to the driver by reflection. In FIG. 1, a viewing area 34 of the driver for driving is indicated and the projected image of the head-up display 32 is shown with boundary lines 36. In terms of the driver's view, the projected image 36 is located at least partially inside the viewing area 34. This enables the driver to obtain information without taking his eyes off the traffic ahead. This information can comprise details which are otherwise displayed on the multi-purpose instrument or on the central display apparatus of the on-board computer such as, for example, the speed or directions from the navigation system. Other safety-relevant information, such as distance warnings, may additionally or alternatively be communicated to the driver by the head-up display 32.

Figure 2:
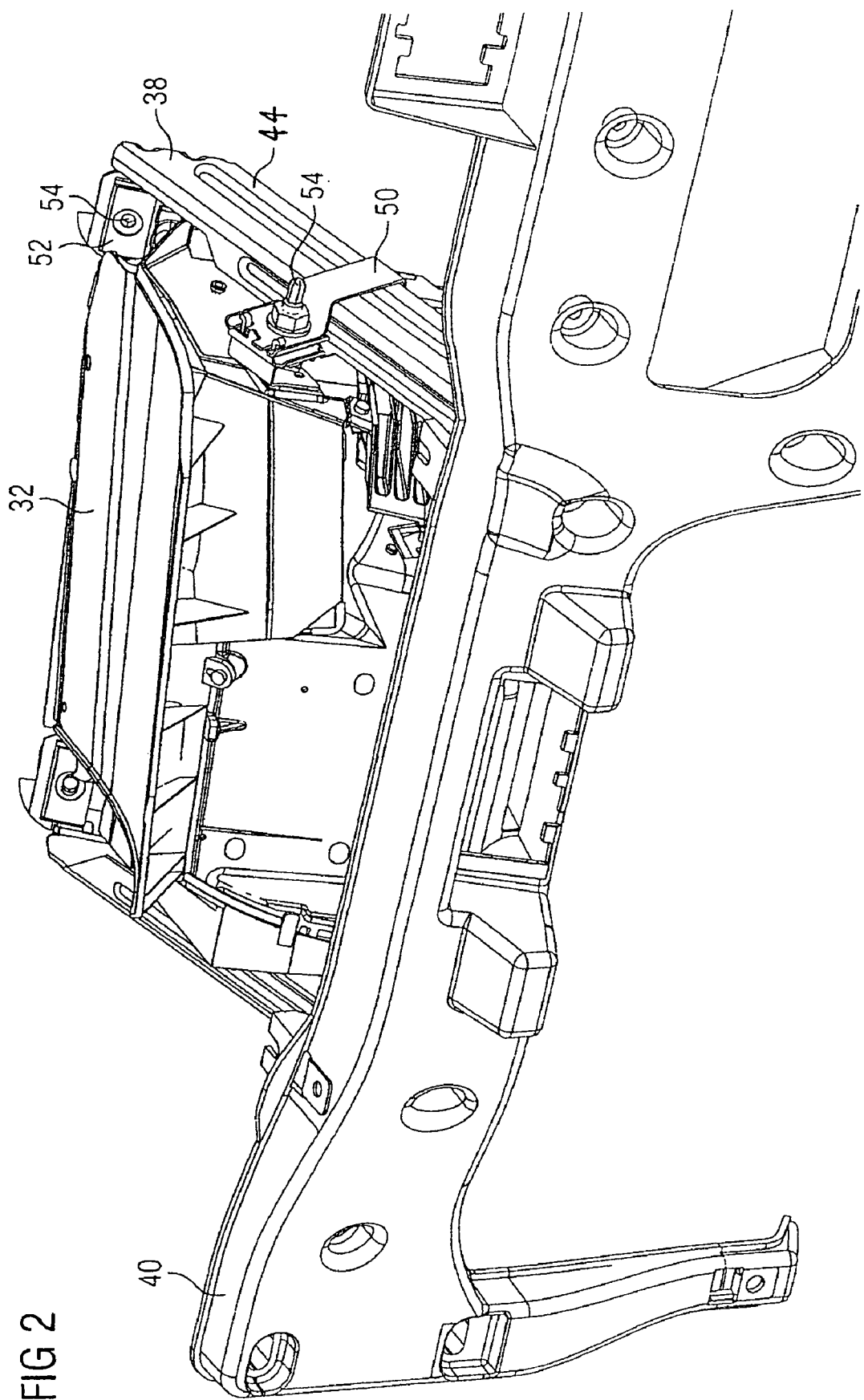
FIG. 2 is a perspective view of the head-up display of the vehicle cockpit shown in FIG. 1.
Figure 3:
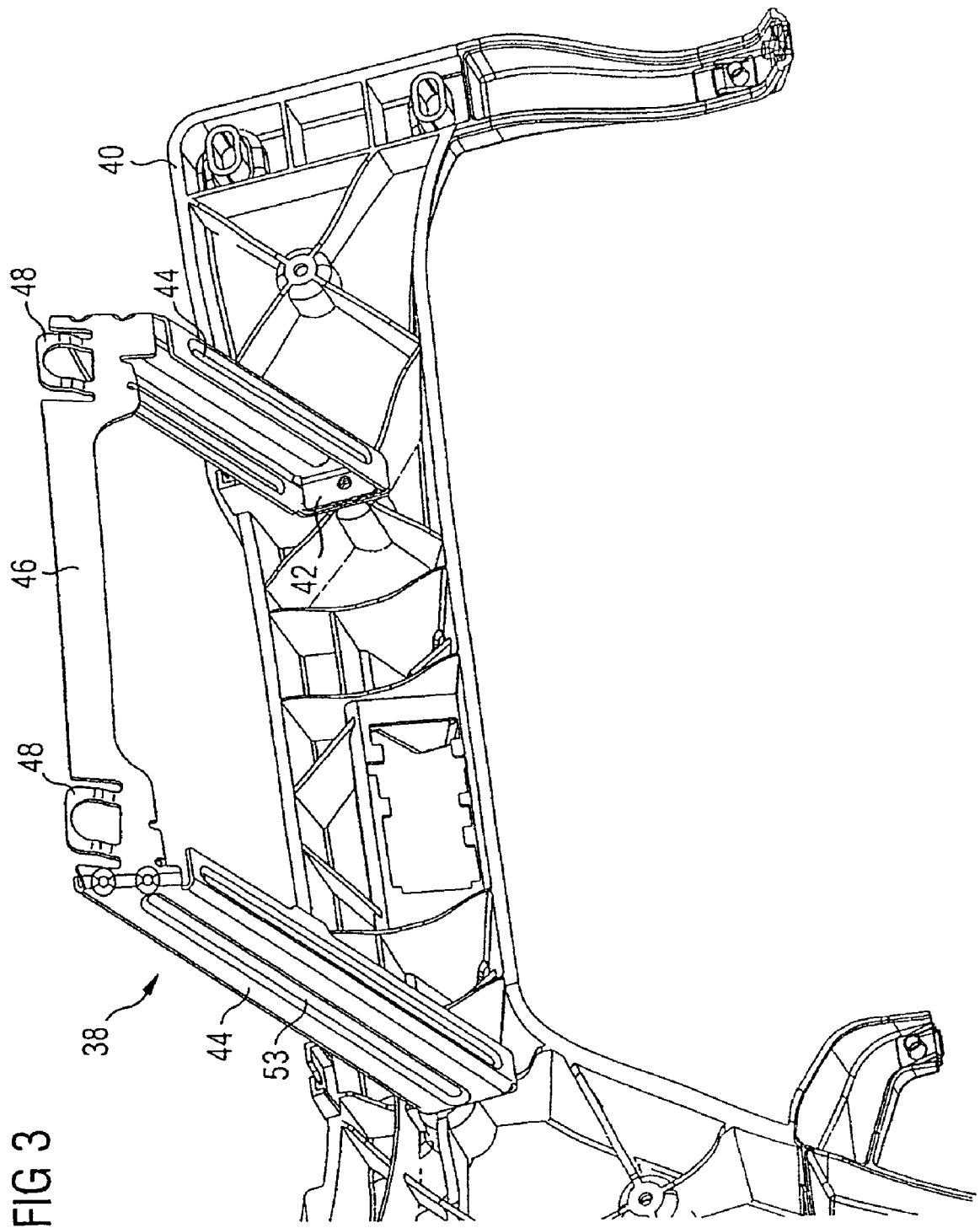
FIG. 3 is an enlarged view of the holder for the head-up display of FIG. 2.
Figure 4:
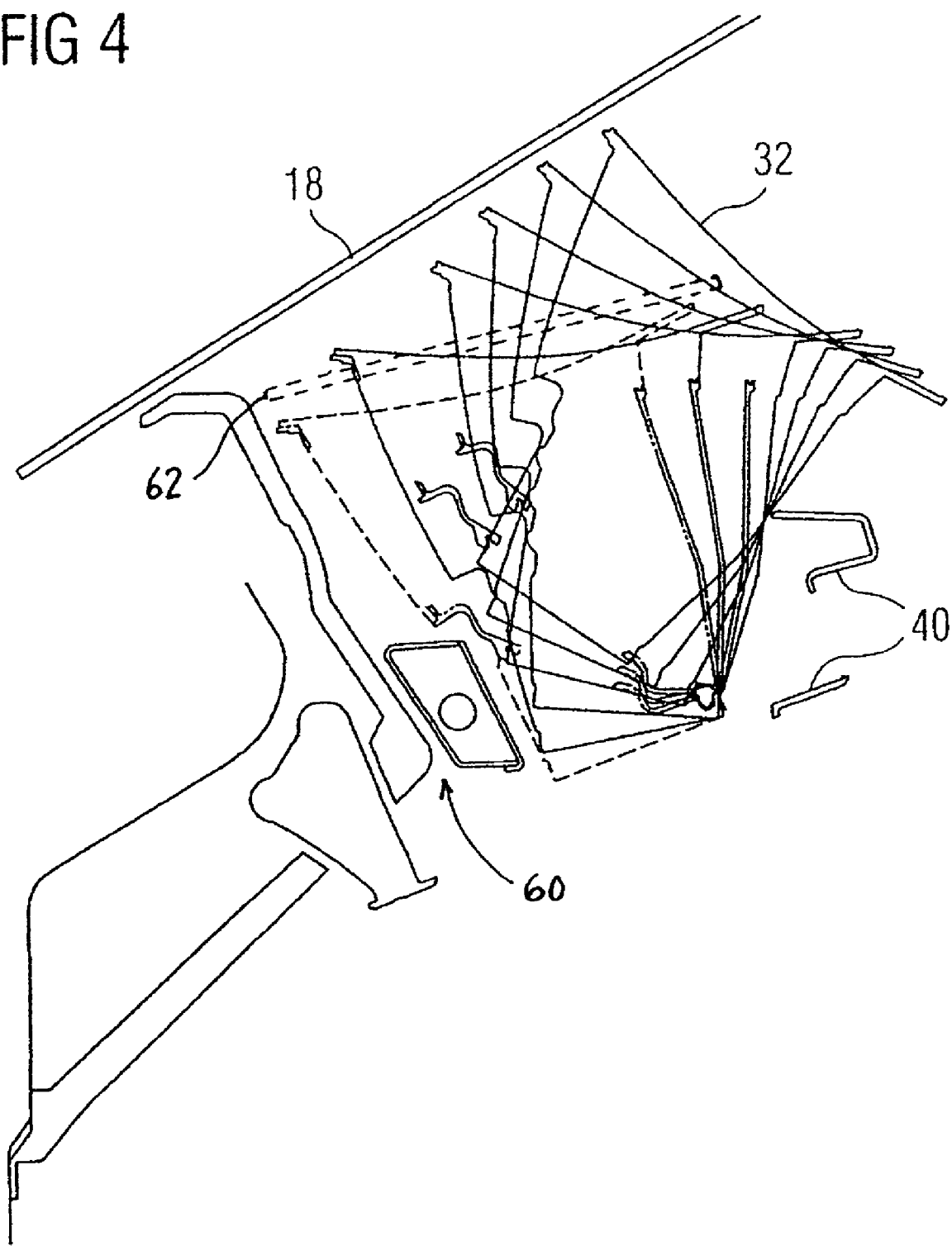
FIG. 4 is a sectional side view showing movement of a head-up display during dismantling of the head-up display from the vehicle cockpit of FIGS. 1-3.

FIG. 2 shows a section of the vehicle cockpit of FIG. 1 with the head-up display 32 which is fitted on a transverse beam 40 (the transverse beam is not illustrated in FIG. 1) with the aid of a holder 38. Referring also to FIG. 3, the holder 38 is a U-shaped frame which is attached to the transverse beam 40 by ends 42 of lateral limbs 44. The holder 38 also has a central area 46 that is attached to a supporting body part 60 (see FIG. 4), such as to the end wall separating the passenger compartment from the engine compartment or to the windshield frame, underneath the front windshield in the central area 46. The closer the attachment position is to the projection face 36, the lower the risk of interfering oscillations. Lugs 48 are provided on the holder 38 for purposes of attachment to the supporting body part.

To fit or install the head-up display 32, the holder 38 is first installed onto the transverse beam 40. The holder 38 thus forms a type of place holder for the head-up display 32. Once the holder 38 is fitted to the transverse beam 40, the head-up display 32 is inserted in the holder 38 and secured to the lateral limbs 44 of the holder 38 using attachment brackets 50. In this embodiment, the transverse beam 40 is pre-fit with the holder 38 and the head-up display 32 so that these components are inserted in the vehicle as a module. After the insertion of the module, the head-up display 32 is attached to the end wall or to the lower windshield frame. To this end, the head-up display 32 has attachment lugs 52 which are supported by the lugs 48 of the holder 38. Each of a corresponding pair of lugs 48, 52 is attached to the supporting part in one step using one screw 54, or any other known or hereafter developed fastener. The frame of the holder 38 has the required stiffness on account of crimps 53 provided on the limbs 44.

Thus, the head-up display 32 is integrated into a modular cockpit design on account of the pre-installation of said head-up display 32, in which modular design as many components as possible are assembled outside the vehicle to form one or more manageable units. In addition to a simpler fitting process, another advantage is that the pre-installed module can be checked outside the vehicle for its electrical and mechanical functions and, if necessary, can be repaired and replaced.

Rather than inserting the transverse beam 40 with the already pre-installed head-up display 32 in the vehicle as a module, it is also possible for only the holder 38 to be pre-installed to the transverse beam 40. The module consisting of the transverse beam 40 and the holder 38 can then be inserted in the vehicle without the head-up display 32. The head-up display 32 is then integrated at a later point in time, for example during the further course of the final assembly of the vehicle. Since the attachment means can be accessed, the necessary adjustment is possible after installation. The adjustment is effected via a height adjustment mechanism (not shown).

It is further conceivable for the vehicle to be retrofitted with a head-up display 32 only at a later date. To this end, initially only the holder 38 would be pre-fitted on the transverse beam 40 and installed together with the latter as a module. The head-up display 32 could then be ordered later, if necessary, and be inserted in the holder 38, adjusted and secured. Only the cover in the area of the head-up display 32 would have to be replaced by a screen frame.

The attachment to the supporting structure 60 underneath the front windshield 18 holds the head-up display 32 such that no relative movements between windshield 18 and head-up display on account of jolts and vibrations during operation of the vehicle can occur, which, given the optical refractions, is of fundamental significance for the visibility of the image on the windshield 18.

The head-up display 32 fitted in a vehicle can also be dismantled and installed again with acceptable effort at a later date. To this end, it is merely necessary for a screen 62 to be removed to allow loosening the freely accessible attachment means, e.g. in the form of screws 54. Subsequently, the head-up display 32 can, in the manner shown in FIG. 4, be pivoted out of the holder 38 and removed. The dimensions of the head-up display 32 are matched to the distance between the front windshield 18 and the transverse beam 40 such that there is sufficient play for the front windshield 18 not to be damaged by the dismantling and installation of the head-up display 32. This translates to a high degree of servicing ease in the case of repairs and servicing, i.e., a cost advantage in the case of servicing.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vehicle cockpit for installation in a vehicle having an end wall for separating a cockpit area from an engine compartment of the vehicle, comprising:
    a transverse beam;
    a head-up display;
    attachment means configured to pre-install said head-up display onto said transverse beam and final-install said head-up display on a further supporting body part in said vehicle.

2. The vehicle cockpit of claim 1, wherein said transverse beam with said head-up display pre-installed thereto are insertable in the vehicle as a module.

3. The vehicle cockpit of claim 1, further comprising a screen part covering said head-up display when said head-up display is installed in said vehicle, wherein said attachment means of said head-up display is accessible after said head-up display is installed in the vehicle by removing said screen part such that said head-up display is removable and re-insertable independently of said attachment means and said transverse beam.

4. The vehicle cockpit of claim 1, wherein said attachment means comprise a holder for accommodating said head-up display and for attaching said head-up display to said transverse beam and the further supporting body part.

5. The vehicle cockpit of claim 4, wherein said holder is a U-shaped frame having limbs connected by a middle region, said limbs having limb ends attachable to said transverse beam for pre-installation of the holder onto said transverse beam, said holder further having at least one lug at said middle region arranged and dimensioned for attachment to the further supporting body part.

6. The vehicle cockpit of claim 5, wherein said head-up display has at least one attachment lug for supporting the head-up display on said at least one lug of said holder.

7. The vehicle cockpit of claim 1, wherein said head-up display pre-installed onto said transverse beam is configured to be mechanically and electrically tested prior to installation in said vehicle.

8. A method for installing a vehicle cockpit with a head-up display, a transverse beam, and an end wall for separating the cockpit from the engine compartment, said method comprising:
    pre-installing the head-up display onto the transverse beam by attachment means;
    inserting the transverse beam with the pre-installed head-up display in the vehicle as a module; and
    securing the head-up display to a further supporting body part after said step of inserting.

9. The method of claim 8, said step of pre-installing comprises the substeps of attaching a U-shaped holder to the transverse beam, and inserting the head-up display into the holder.

* * * * *